United States Patent [19]
Snell et al.

[11] Patent Number: 5,954,616
[45] Date of Patent: Sep. 21, 1999

[54] STEERING-COLUMN-MOUNTED SHIFT CONTROL ASSEMBLY

[75] Inventors: William M. Snell, Grand Blanc; Christopher M. Slon, Birmingham, both of Mich.

[73] Assignee: Chrysler Corporation, Auburn Hills, Mich.

[21] Appl. No.: 09/039,763

[22] Filed: Mar. 16, 1998

[51] Int. Cl.⁶ .......................... B60K 41/04; B60R 25/04; B60R 25/06
[52] U.S. Cl. ............................................. 477/99; 70/248
[58] Field of Search ................................ 477/99; 70/248

[56] References Cited

U.S. PATENT DOCUMENTS

| | | | |
|---|---|---|---|
| 3,490,255 | 1/1970 | Wight et al. | 70/252 |
| 5,289,732 | 3/1994 | Snell | 74/473 |
| 5,299,470 | 4/1994 | Snell et al. | 74/850 |
| 5,511,641 | 4/1996 | Snell et al. | 477/96 X |

*Primary Examiner*—Allan D. Herrmann
*Attorney, Agent, or Firm*—Lawrence J. Shurupoff

[57] ABSTRACT

A transmission control for an engine of an automotive vehicle wherein the vehicle has a steering column assembly having a steering wheel unit pivoted to a rear end portion of a steering column for limited arcuate movement provided with a key-operated cylinder forming part of an ignition system for the engine. A gate is mounted on the steering column and has a plurality of spaced detents corresponding to the usual gearshift positions. A gearshift lever is movable relative to the gate and has a part selectively engageable in the detents. A gearshift blocker is supported on the steering column for pivotal movement to and from an operative position blocking movement of the gearshift lever away from the PARK position. A link is supported on the steering column for sliding movement in opposite directions and has a lost-motion pivotal connection to the blocker to pivot the blocker to its operative position when the link in slid in one direction and away from its operative position when the link in slid in the opposite direction. The link is moved in one direction by an arm pivoted on the steering wheel unit operated by an actuator on the key-operated cylinder. A head on the arm engages a head on the link. These heads are curved on an axis coinciding with the axis of pivotal movement of the steering wheel unit so that the blocker may be operated by operation of the key-operated cylinder in any angular position of the steering wheel unit.

15 Claims, 5 Drawing Sheets

STEERING-COLUMN-MOUNTED SHIFT CONTROL ASSEMBLY

This invention relates generally to vehicle transmission shift control assemblies and more particularly to a column-mounted shift control assembly.

BACKGROUND AND SUMMARY OF THE INVENTION

Column-mounted vehicle transmission control assemblies heretofore have consisted of complex linkages which caused binding, created key extraction problems and were not well suited to steering columns in which the steering wheel is tiltable. What is needed is a column-mounted shift control which is of relatively simple construction, has no binding problems, and is well suited for use with a steering column of the type having a tilt steering wheel.

In accordance with the invention, a steering wheel unit is pivoted to the rear end portion of the steering column. A key-operated cylinder forming part of an ignition system for the engine is mounted on the housing of the steering wheel unit and is rotatable to an ON position to start the engine and an OFF position to stop the engine. The transmission control includes a gate mounted on the steering column having a plurality of spaced detents corresponding to the usual gearshift positions, and a gearshift lever movable relative to the gate and selectively engageable in any one of the detents. A gearshift blocker is supported on the steering column for movement to and from an operative position blocking movement of the gearshift lever away from the PARK position. The key-operated cylinder has an actuator. Means operated by the actuator in any position of the steering wheel unit within its range of limited pivotal movement in response to rotation of the cylinder to the OFF position moves the blocker to its operative position, blocking movement of the gearshift lever away from the PARK position.

Preferably the blocker is supported for pivotal movement and the means for moving the blocker includes a link on the steering column slidable in opposite directions and having a lost-motion pivotal connection with the blocker to pivot the blocker to its operative position when the link is slid in one direction and away from its operative position when the link is slid in the opposite direction. Preferably the means for moving the blocker further includes an arm pivoted on the steering wheel unit housing for movement by the actuator, the arm having a head engageable with a head on the link. The two heads preferably have arcuately formed, interengaging surfaces which are centered on the axis of the pivot axis of the steering wheel unit so that the actuator is effective to shift the link in any position of the steering wheel unit within its range of movement.

One object of this invention is to provide a transmission control for an automotive vehicle engine having the foregoing features and capabilities.

Another object is to provide a transmission control which is of relatively simple construction and is effective to be operated in all positions of the tilt steering wheel, which is rugged and durable in use and formed of a relatively few simple parts.

These and other objects, features and advantages of the invention will become more apparent as the following description proceeds, especially when considered with the accompanying drawings.

DETAILED DESCRIPTION OF THE PREFERRED EMBODIMENTS

Figures 1, 8:
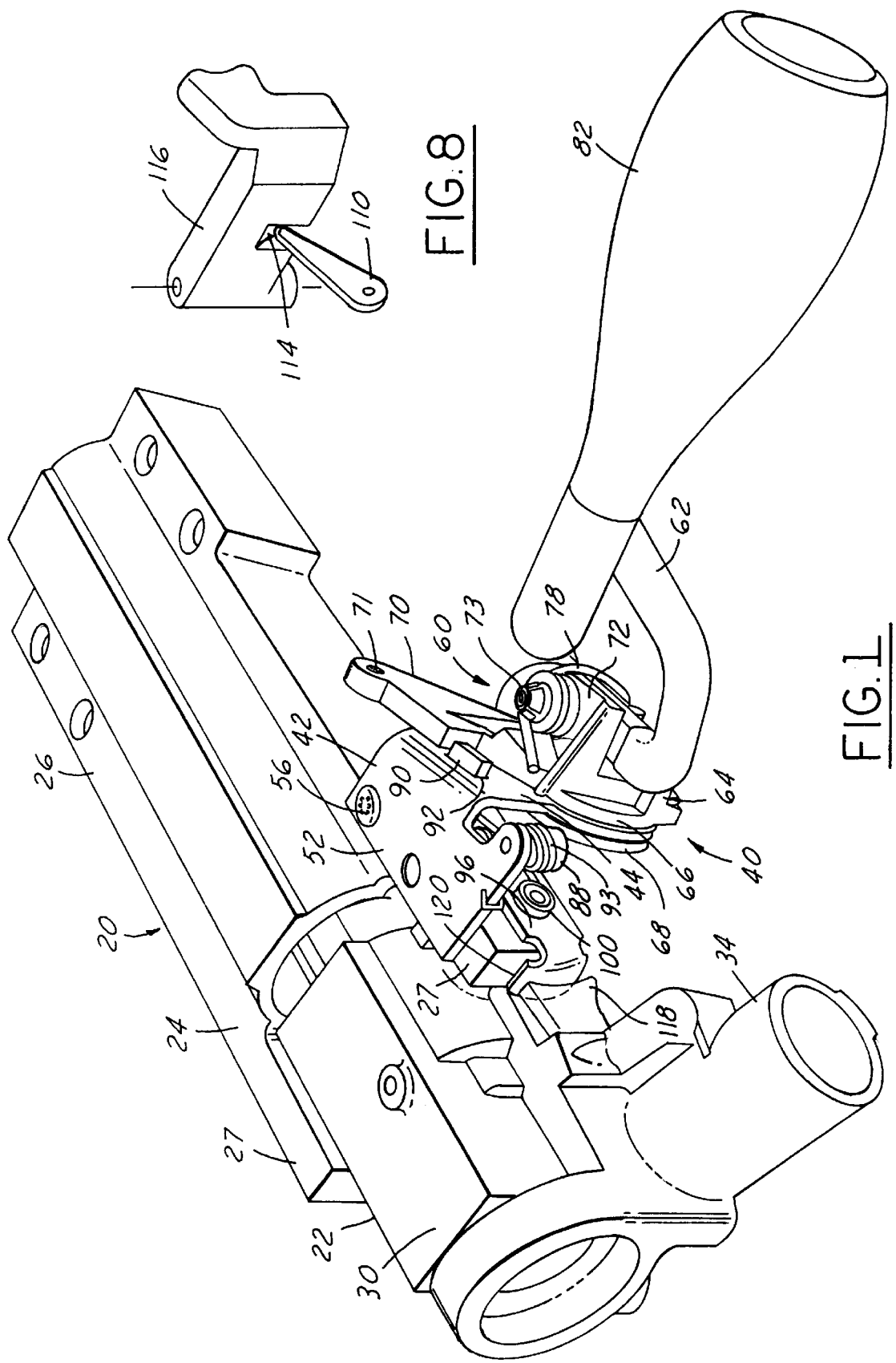
FIG. 1 is a perspective view of a transmission shift control for the engine of an automotive vehicle shown mounted on a steering column, and constructed in accordance with the invention.
FIG. 8 is a semi-diagrammatic detail view in perspective showing the relationship of the actuator on the key-operated cylinder of the ignition system to the pivoted arm which operates the blocker.
Figure 2:
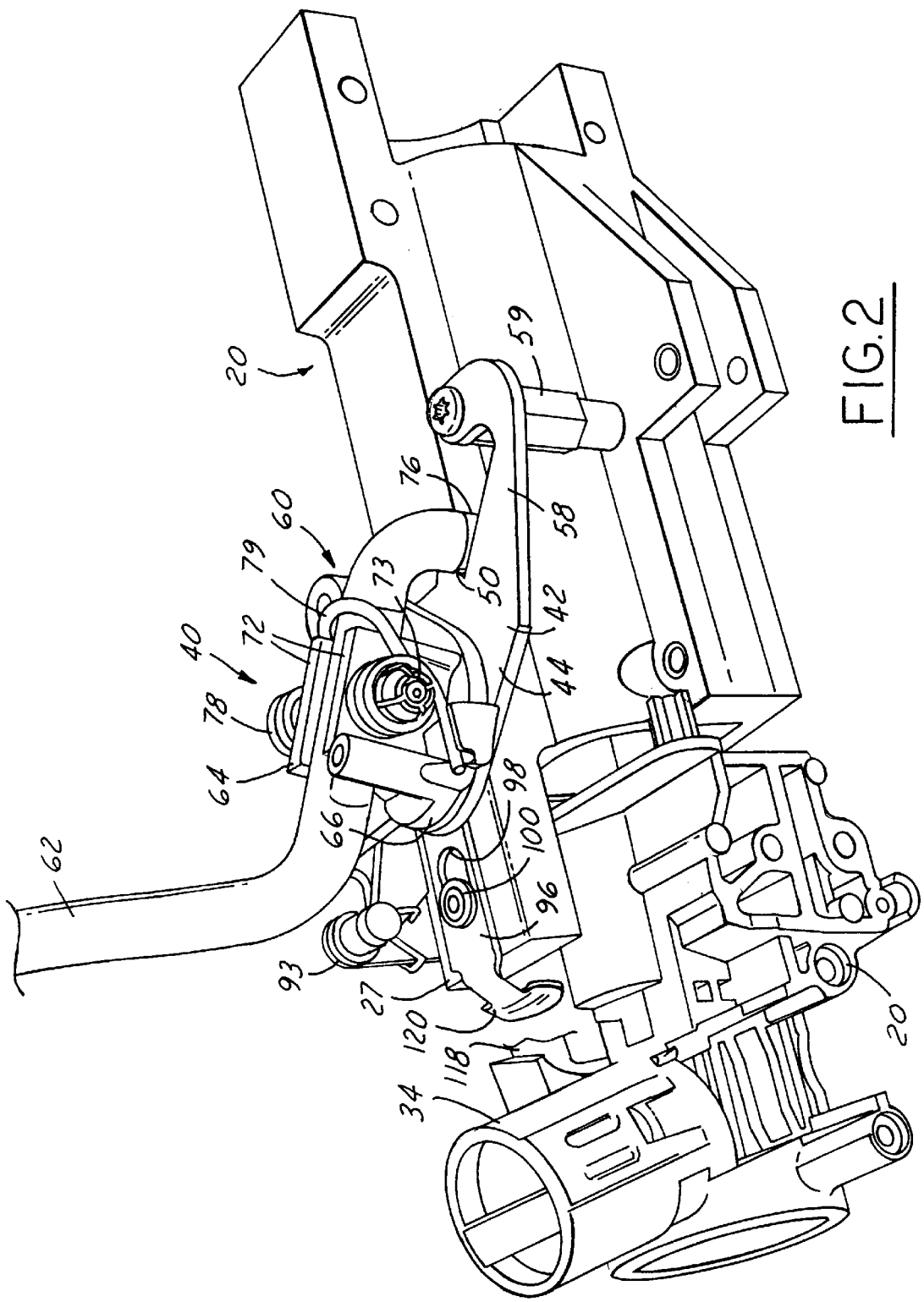
FIG. 2 is a perspective view, with parts broken away, of the structure shown in FIG. 1, but taken from a different angle.
Figure 3:
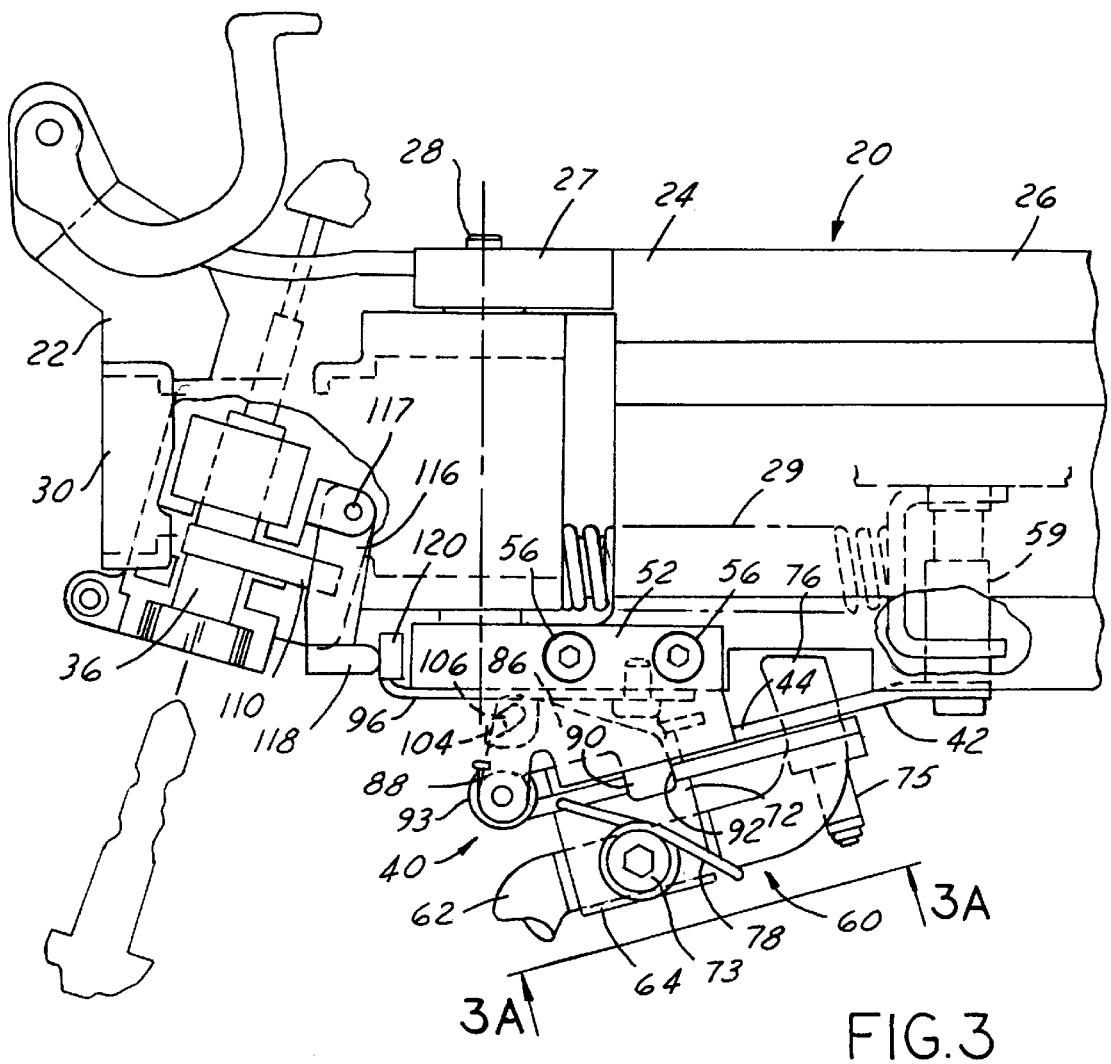
FIG. 3 is a fragmentary, top plan view of the structure shown in FIGS. 1 and 2, with parts broken away.

Referring now more particularly to the drawings, there is shown a steering column assembly 20 for an automotive vehicle, having a steering wheel unit 22 pivoted to a rear end portion 24 of an elongated steering column 26 (FIGS. 1–3). The rear end portion 24 of the steering column has laterally spaced apart hinge knuckles 27 to which the steering wheel unit 22 is pivoted on a horizontal, transverse pivot pin 28 for limited arcuate movement. A spring 29 urges the steering wheel unit 22 upwardly. The steering wheel unit 22 includes a housing 30 in which a steering wheel (not shown) is supported. The housing 30 has a hollow, tubular formation 34 in which a key-operated cylinder 36 is rotatably supported. The cylinder 36 is part of an ignition system for the vehicle engine. The cylinder is rotatable to an ON position to start the engine and an OFF position to stop the engine.

Figure 3A:
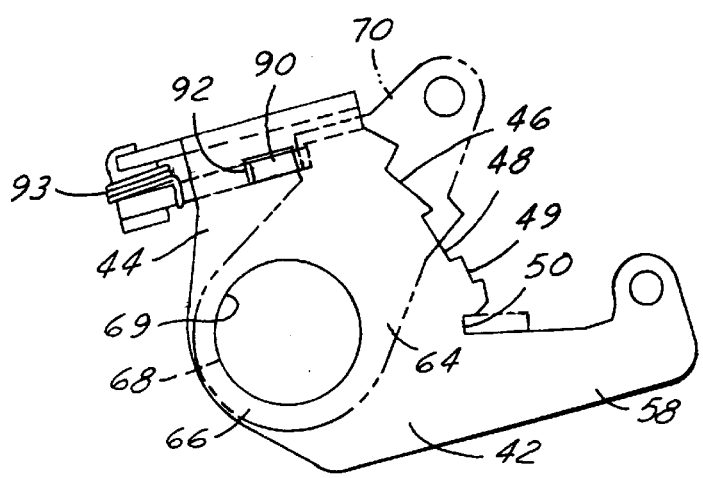
FIG. 3A is a view taken on the line 3A—3A in FIG. 3, but with the gearshift lever removed and the support for the gearshift lever shown in broken lines.

A transmission shift control 40 is provided, including a gate 42 (FIGS. 1, 2 and 3A) which is in the form of a plate having a flat body portion 44 provided with a plurality of spaced detents 46, 48, 49 and 50 along one edge. The detent 50 corresponds to a PARK setting of the engine transmission, the other detents corresponding to the usual NEUTRAL, FORWARD DRIVE, and REVERSE transmission settings. The gate 42 has an integral flange 52 extending at right angles to the body portion 44 which is secured to the steering column 26 by fasteners 56 to rigidly mount the gate on the steering column. The body 44 of the gate also has an arm 58 secured to the steering column 26 by a bolt 59.

Figure 4:
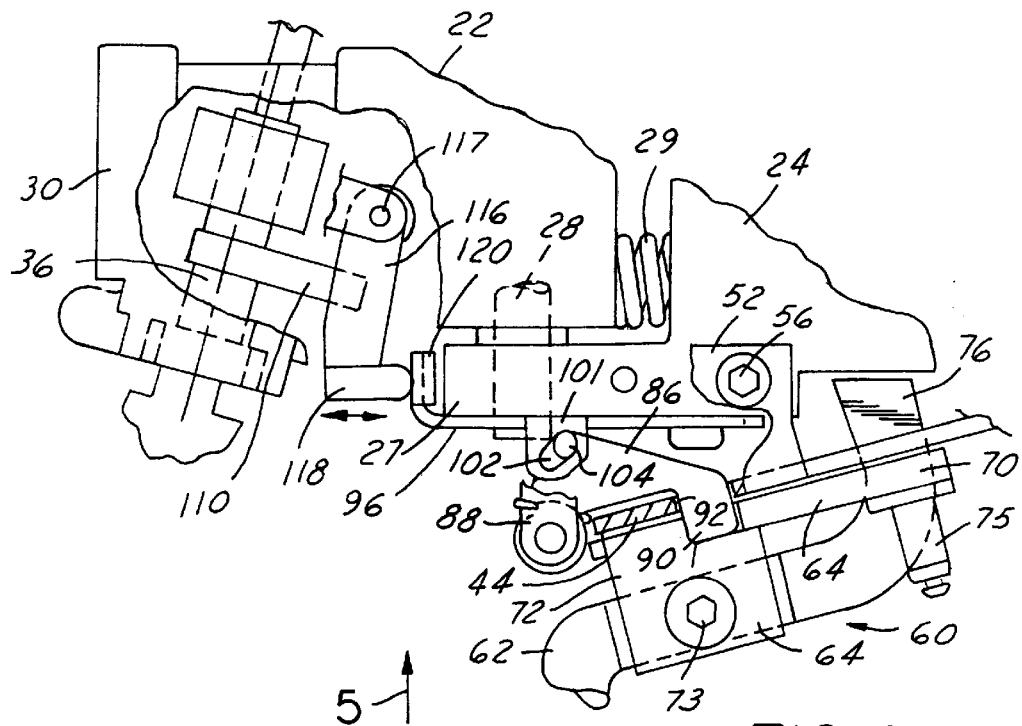
FIG. 4 is a fragmentary view of portions of FIG. 3, with parts broken away and in section.
Figure 5:
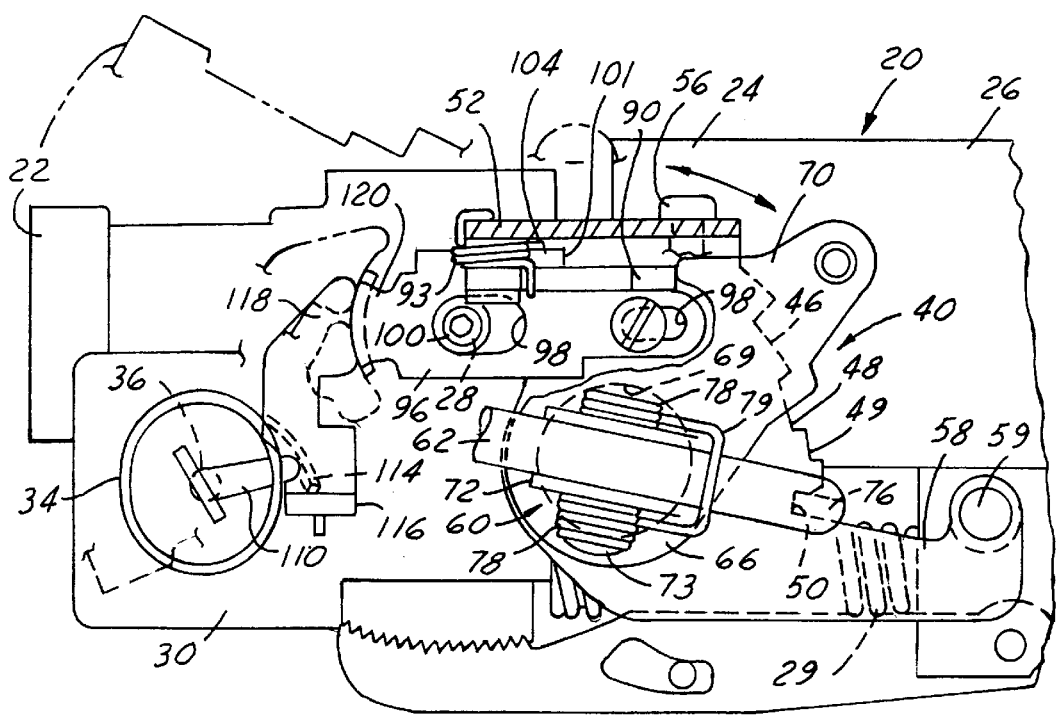
FIG. 5 is a fragmentary view taken in the direction of the arrow 5 in FIG. 4, with parts broken away and in section.

A gearshift lever assembly 60 includes an elongated gearshift lever 62 and a gearshift lever support 64 (FIGS. 1, 2, 3). The support 64 has a plate portion 66 formed with a hub 68 extending through and rotatably supported in a hole 69 in the body 44 of the gate 42. The plate portion 66 of the support 64 lies substantially flush against the body portion 44 of the gate and has an extension 70 formed with an opening 71 adapted to be connected to a cable (not shown) leading to the engine transmission. A cable pin 75 projects from the opening 71 as shown in FIGS. 3 and 4. The pin 75 is provided for attachment to the cable. Laterally spaced ears 72 project from the plate portion 66 of the support 64 between which a mid-portion of the lever 62 extends and is pivoted on a pivot pin 73. The inner end of the gearshift lever has flattened portion or part 76 (FIGS. 3 and 4) which is selectively engageable in any one of the detents 46–50 depending on the rotative position of the gearshift lever support 64. A spring 78 (FIGS. 2 and 5) has coiled ends attached to the ends of the pivot pin 73. A mid-portion 79 of the spring resiliently bears on the gearshift lever 62 to urge the gearshift lever in a direction to cause the part 76 on the inner end of the lever to engage in a registering detent. The outer end of the lever has a handle 82 for manually rotating the gearshift lever assembly on the hub 68 and for pivoting the lever about pivot pin 73 against the force of the spring 78.

An elongated blocker 86 (FIGS. 3, 4, 6 and 7) has one end 88 pivoted to the flange 52 of the gate 42. A nose 90 on the opposite end of the blocker is adapted to project through a hole or window 92 in the body 44 of the gate to engage a rear edge of the extension 70 of the gearshift lever support 64 when it is in the PARK position, thereby preventing the gearshift lever assembly from moving away from the PARK position. The blocker 86 is urged toward the position in which its nose 90 projects through the hole 92 by a spring 93.

Figure 6:
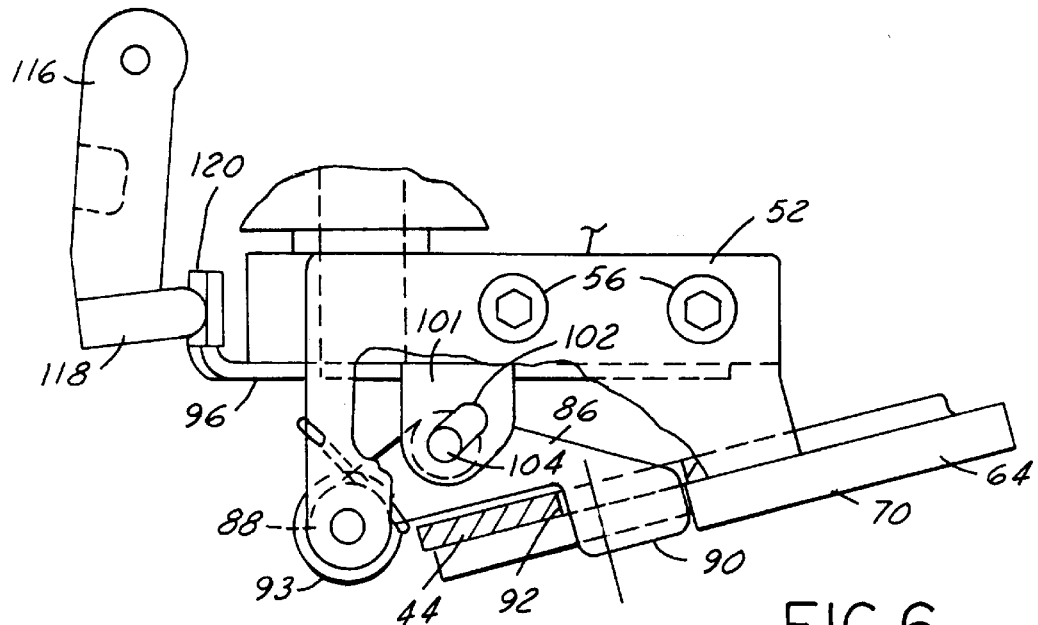
FIG. 6 is an enlargement of a portion of FIG. 4.
Figure 7:
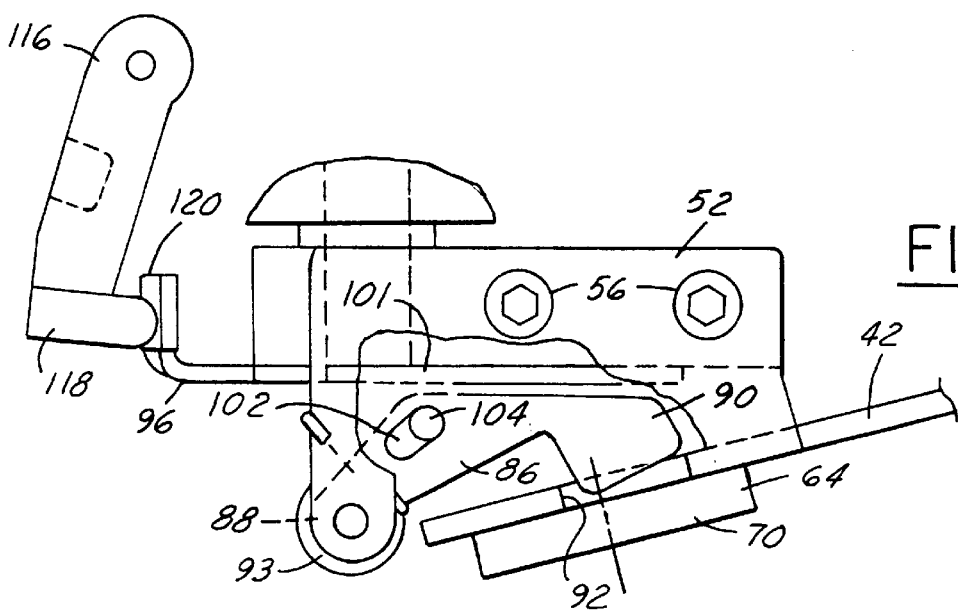
FIG. 7 is similar to FIG. 6, but shows the parts in a different position.
Figure 9:
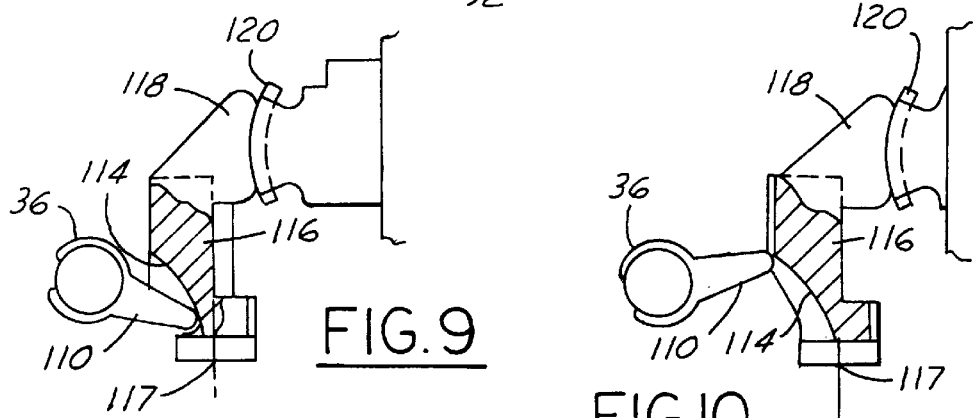
FIGS. 9 and 10 are fragmentary views showing parts of the control in two different positions.
Figure 10:
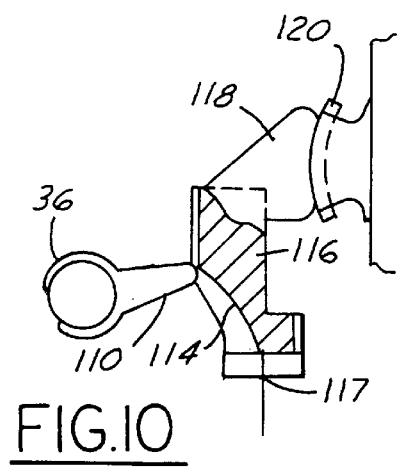

An elongated flat link 96 (FIGS. 1–7) has longitudinally spaced holes 98 which are elongated lengthwise of the link and slidably receive pin heads 100 on the steering column 26 so that the link is longitudinally slidable. The link 96 has an integral tab 101 (FIGS. 4 and 6) formed with an elongated slot 102. The slot 102 receives a pin 104 projecting from the blocker 86 about midway between the ends of the blocker to provide a lost-motion pivot connection. When the link slides rearwardly, it pivots the blocker in a direction causing its nose 90 to retract from the window 92 and from blocking engagement with the extension 70 of the gearshift lever support 64 (FIG. 7). When the link slides forwardly, the lost-motion connection to the blocker causes the blocker to pivot in the opposite direction, projecting its nose 90 through the window 92 into blocking engagement with the extension 70 of the gearshift support 64, preventing the lever assembly from moving away from PARK (FIGS. 4 and 6). The spring 93 for the blocker urges the link 96 in a rearward direction.

An actuator 110 projects radially outwardly from the cylinder 36 (FIGS. 3–5 and 8–10). The outer end of the actuator 110 is engageable with a cam surface 114 on an arm 116. One end of the arm 116 is pivoted to the housing 30 of the steering wheel unit 22 at 117. The other end of the arm 116 has a head 118 which is arcuate in shape, and in flush engagement with an arcuate head 120 on the rear end of the flat link 96 (FIGS. 1–5 and 8–10). The center of the arc of the two heads 118 and 120 coincide with the axis of the pivot pin 28 which supports the steering wheel unit housing 30 on the steering column 26. The two heads 118 and 120 have a flush sliding engagement with one another in all positions of the steering wheel unit 22 within its range of limited arcuate movement as is evident in FIG. 5 where the positions of the head 118 at the extreme ends of the range of steering wheel unit movement is shown in broken lines.

When the key-operated cylinder 36 is rotated to the OFF position, the action of the actuator 110 against cam surface 114 produces rotation of the arm 116 in a direction causing the head 118 to push forwardly against the head 120 of the flat link 96. The steering wheel unit 22 can be at any position within its range of arcuate movement at this time. This pushes the flat link 96 forwardly against the force of spring 93, pivoting the blocker 86 in a direction causing its nose 90 to project through the window 92 in the body 44 of the gate to engage behind the rear edge of the extension 70 of the gearshift lever support 64 when the gearshift lever assembly is in the PARK position (FIGS. 3, 3A, 4 and 6). This prevents the gearshift lever assembly from moving away from the PARK position. If, when the cylinder 36 is rotated toward the OFF position, the gearshift lever assembly 60 is not in the PARK position but is, for example, in engagement with one of the other detents, the extension 70 of the plate portion 66 of the support 64 of the gearshift assembly serves as a wall which will cover the window 92 and prevent the nose 90 of the blocker from projecting through the window (FIG.7). This prevents the key-operated cylinder from being rotated to the full OFF position for removal. When this happens, it is expected that the driver will understand that he must shift the gearshift lever assembly to the PARK position so that the blocker nose 90 can be projected through the window 92 into blocking engagement with the rear edge of the extension 70 of the gearshift lever support 64 and the cylinder permitted to rotate to the full OFF position in which the key may be removed.

When the driver wishes to start the engine, the driver will rotate the key-operated cylinder to the ON position in which the action of the actuator 110 against the cam surface 114 produces rotation of the arm 116 in a direction to enable the link 96 to be slid in a rearward direction under the influence of the spring 93. This movement of the link 96 will produce a rotation of the blocker 86 in a direction to withdraw its nose 90 from blocking engagement with the gearshift support and thereupon to enable the gearshift lever assembly to be shifted to the desired position for operation of the vehicle transmission.

What is claimed is:

1. A transmission shift control for an engine of an automotive vehicle, wherein the vehicle has a steering column assembly comprising a steering wheel unit pivoted to an end portion of an elongated steering column for limited arcuate movement about a transverse axis and the steering wheel unit has a housing provided with a key-operated cylinder forming part of an ignition system for the engine rotatable to an ON position to start the engine and an OFF position to stop the engine, said transmission control comprising, a gate mounted on said steering column having a plurality of spaced detents corresponding to various transmission settings and including a PARK detent corresponding to a PARK transmission setting, a gearshift lever assembly movable relative to said gate and including a gearshift lever having a part selectively engageable in any of one said respective detents depending on the position of said gearshift lever assembly, a gearshift blocker, means supporting said blocker on said steering column for movement to and from an operative position blocking movement of said gearshift lever assembly away from a PARK position in which said part of said lever is engageable with said PARK detent, said key-operated cylinder having an actuator, means operated by said actuator in any position of said steering wheel unit within its range of limited arcuate movement in response to rotation of said cylinder to said OFF position for moving said blocker to the operative position thereof, and a wall preventing movement of said blocker to the operative position thereof when said gearshift lever assembly is in a position other than the PARK position, said wall being an integral part of said gearshift lever support.

2. A transmission shift control for an engine of an automotive vehicle, wherein the vehicle has a steering column assembly comprising a steering wheel unit pivoted to an end portion of an elongated steering column for limited arcuate movement about a transverse axis and the steering wheel unit has a housing provided with a key-operated cylinder forming part of an ignition system for the engine rotatable to an ON position to start the engine and an OFF position to stop the engine, said transmission control comprising, a gate mounted on said steering column having a plurality of spaced detents corresponding to various transmission settings and including a PARK detent corresponding to a PARK transmission setting, a gearshift lever assembly movable relative to said gate and including a gearshift lever having a part selectively engageable in any of one said respective detents depending on the position of said gearshift lever assembly, a gearshift blocker, means supporting said blocker on said steering column for movement to and from an operative position blocking movement of said gearshift lever assembly away from a PARK position in which said part of said lever is engageable with said PARK detent, said key-operated cylinder having an actuator, means operated by said actuator in any position of said steering wheel unit within its range of limited arcuate movement in response to rotation of said cylinder to said OFF position for moving said blocker to the operative position thereof, said means for moving said blocker comprising a link slidably mounted on said steering column and connected to said blocker, an arm pivoted on said steering wheel unit housing for movement by said actuator, said arm engaging said link, and a first head on said arm engaging a second head on said link, said heads having arcuately formed, interengaging surfaces which are centered on the axis of pivotal movement of said steering wheel unit, wherein said blocker is supported on said steering column for pivotal movement, said link is supported on said steering column for sliding movement in opposite directions and has a lost-motion pivotal connection to said blocker to pivot said blocker to its operative position when said link is slid in one direction and away from its operative position when said link is slid in the opposite direction.

3. A transmission control as in claim 2, wherein said lost-motion connection is formed by a pin in an elongated slot.

4. A transmission control as in claim 3, further including spring means urging said link in the opposite direction and effective to move said link in the opposite direction when said cylinder is in the ON position thereof.

5. A transmission control as in claim 4, further including a support for said gearshift lever, said gate having a body portion on which said gearshift lever support is rotatably mounted for movement relative to said gate to bring said part of said lever into registration with said respective detents, said blocker having a nose at one end, said body portion having a window to clear said nose when said blocker is moved to its operative position so that said nose can engage said support and prevent movement of said gearshift assembly away from the PARK position.

6. A transmission control as in claim 5, including an integral wall of said gearshift lever support preventing movement of said blocker to its operative position when said gearshift lever assembly is in a position other than the PARK position.

7. A transmission shift control for an automotive vehicle engine comprising, a gate having a plurality of spaced detents corresponding to various transmission settings and including a PARK detent corresponding to a PARK transmission setting, a gearshift lever assembly comprising a gearshift lever having a part selectively engageable in any one of said respective detents, a support for said gearshift lever, means mounting said support for movement relative to said gate to bring said part of said lever into registration with said respective detents, a gearshift blocker, means supporting said blocker for pivotal movement to and from an operative position blocking movement of said support away from a PARK position in which said part of said lever is engageable with said PARK detent, a key-operated cylinder, forming part of an ignition system for the engine, rotatable to an ON position to start the engine and an OFF position to stop the engine, means for moving said blocker to the operative position thereof in response to rotation of said cylinder to said OFF position when said gearshift lever support is in the PARK position, said means for moving said blocker comprising a link supported for sliding movement in opposite directions and connected to said blocker to pivot said blocker to its operative position when said link is slid in one direction and away from its operative position when said link is slid in the opposite direction, means including an actuator on said cylinder for moving said link in said one direction, and spring means urging said link in the opposite direction and effective to move said link in said opposite direction when said cylinder is in the ON position thereof.

8. A transmission control as in claim 7, further including means preventing movement of said blocker to the operative position thereof when said support is in a position other than the PARK position.

9. A transmission control as in claim 7, further including a wall preventing movement of said blocker to the operative position thereof when said gearshift support is in a position other than the PARK position.

10. A transmission control as in claim 9, wherein said wall is an integral part of said gearshift lever support.

11. A transmission control as in claim 12, wherein said means for moving said link in said one direction includes an arm, said arm having one end pivoted to a fixed support and another end provided with a first head, said arm is pivoted by said actuator, and said link is elongated and slidable lengthwise thereof and has a second head on one end engageable with said first head.

12. A transmission control as in claim 11, wherein said heads have similarly arcuately curved engaging surfaces.

13. A transmission control as in claim 12, wherein the mounting means for said support comprises a body portion of said gate on which said gearshift lever support is rotatably mounted, said blocker having a nose at one end, said body portion having a window to clear said nose when said blocker is moved to its operative position so that said nose can engage said support and prevent movement of said gearshift assembly away from the PARK position.

14. A transmission control as in claim 13, wherein said support has a wall preventing movement of said blocker to the operative position thereof when said support is in a position other than the PARK position.

15. A transmission control as in claim 14, wherein said link is connected to said blocker by a pin and slot lost-motion connection.

* * * * *